April 13, 1937.  S. BRODER  2,077,092

OPHTHALMIC LENS

Filed Jan. 13, 1936

Inventor

Simon Broder

Patented Apr. 13, 1937

2,077,092

UNITED STATES PATENT OFFICE 2,077,092

OPHTHALMIC LENS

Simon Broder, Washington, D. C.

Application January 13, 1936, Serial No. 58,973

2 Claims. (Cl. 88—54)

My invention relates to ophthalmic lenses. More particularly, it has reference to ophthalmic lenses which have a relatively strong negative or minus power, such as are used for myopia. It is understood, however, that the principle of this invention is also applicable to positive lenses, such as are used for hypermetropia.

It is well known that lenses for myopia of a high degree, for example twenty diopters, are very thick. Such lenses are unsightly and embarrass the wearer. They must be ground from thick blanks; the thicker the lens, the more difficult it is to mount in a frame. The glasses are heavy and tend to slide down from the position they should retain for proper correction of the vision. For proper focus, the center of the lens should be a definite distance from the pupil of the eye, and if the myopia is very advanced, the thickness of the lens at the rim prevents the proper positioning of the glass. Indeed, the lashes of many myopes must be trimmed to permit a closer approach of the lenses to the eyes.

The object of my invention is to avoid these disadvantages; to provide finished lenses which may be ground from blanks of uniform thickness no matter what the prescription may be; to provide a lens of light weight and pleasing appearance, which may be worn at the proper distance from the eye. Other objects will appear hereafter.

The accompanying drawing, which forms part of this specification, illustrates some forms of my invention. It is to be understood that the drawing is merely illustrative and not limitative, and that variations may be made therein within the scope of the appended claims. The lenses shown in the drawing are not intended to be drawn to scale but are shown in exaggerated form for the purpose of more clearly illustrating the invention.

Figure 1:
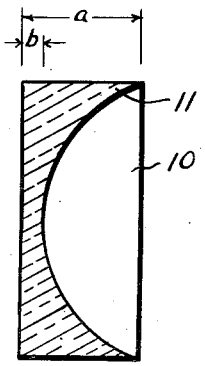
Fig. 1 illustrates, in section, a lens of the type heretofore made.

As already mentioned, lenses of high negative power have very thick rims. In Fig. 1, such a lens 10 is shown as having a thickness $a$. Obviously, the glass must have a minimum thickness $b$ to withstand stress. The thick rim portion 11 absorbs a greater amount of the light rays than does the thin center portion; it is difficult to encircle such a thick lens with a frame, either by means of a beveled rim or otherwise. Also, the portion 11 may abut the eyelashes or other parts of the face, resulting in discomfort and in loss of proper position and focus.

Figure 2:
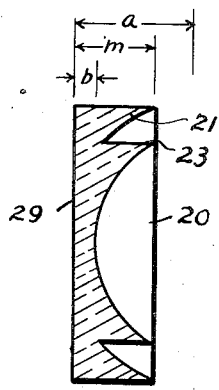
Fig. 2 shows a similar view of a lens made in accordance with my invention.

The lens 20 of Fig. 2 is made in accordance with the principles of my invention. Irrespective of the required focal length or dioptric power specified by the prescription, I utilize a blank of thickness $m$. The minimum thickness is $b$, as in the case of Fig. 1. In grinding the lens, I may start at the rim and grind inwardly, either circularly or cylindrically, as desired, until I reach the minimum thickness $b$. I then make an internal offset as at 23 and continue the grinding to produce the form shown in the figure. Or I may first grind the center portion of the lens, until I attain the minimum thickness, then make the offset 23 where the line of curvature intersects the inner surface of the glass. I then continue the grinding to the rim of the lens. Or I may combine both methods, the only requirement being that I do not reduce the thickness of the glass below the minimum $b$. Or I may fuse together two or more pieces of glass to produce the finished lens.

The outer surface 29, which is here shown as plane, may be ground for myopia, astigmatism, or other defect, either in accordance with the principles of my invention, or, preferably, for the sake of appearance, in an unbroken curved surface. It is understood, of course, that the inner surface may be ground spherically or cylindrically or in combination or otherwise, as the occasion may require. Similarly, the curvatures may be adjusted or compensated for the differences in thickness of the various portions of the lens.

Figure 3:
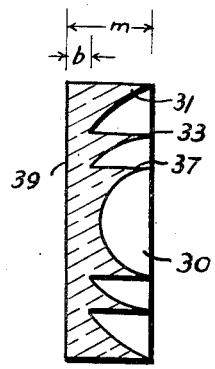
Fig. 3 is a similar view of another form of my invention.

For myopia of a very high order, for example thirty diopters, requiring a focal length which is very short, I may have two or more offsets 33 and 37, as illustrated in Fig. 3. The outside surface 39 is shown as a plane, but here also it may be curved to meet the particular requirements of the patient. The diameter of the central concavity of the lens 30 may be varied within limits, depending on the prescription, the number of offsets, and the thickness of the glass at the center, at the offsets, and at the rim 31, the only essential being, as before, that no portion of the lens be thinner than the minimum $b$. This latitude in construction is desirable in cases where the patients do very close work, or engage in sports, or where appearance is primary, or for other reasons.

The offsets as shown in my drawing are horizontal. It may be desirable in some instances to have them sloping upwardly or downwardly, or curved, but the principles of my invention remain the same.

My invention may also be applied to convex lenses, but here the conditions affecting the appearance of the wearer are not so adverse.

Obviously, my lens may be made of laminated or of tempered or hardened glass, without departing from the spirit of my invention.

Other variations and modifications will occur to those skilled in the art.

I claim:

1. An ophthalmic lens, comprising a refractive material having two ophthalmic surfaces, one of said surfaces having a plurality of negative curvatures of substantially the same radius, the centers of all the curvatures being in concentric axial alignment, the medial lines of each zone of curvature defining areas of substantially equal thickness, whereby the general mass of the lens lies in a thin section.

2. An ophthalmic lens, comprising a refractive material having two ophthalmic surfaces, one of said surfaces being adapted to be positioned in front of the eye and having a plurality of concavities, the centers of all the concavities being in concentric axial alignment, all the concavities having substantially the same focal power, the outer concavities being offset toward the lens, whereby the thickness of the lens at the medial line of each concavity is substantially equal.

SIMON BRODER.